(12) United States Patent
Miceli et al.

(10) Patent No.: US 9,193,491 B1
(45) Date of Patent: Nov. 24, 2015

(54) METHOD FOR PRODUCING LABELS WITH MULTIPLE DESIGNS FOR PRESCRIPTION CONTAINERS

(75) Inventors: Joseph A. Miceli, Spencer, TN (US); David A. Miceli, Reno, NV (US)

(73) Assignee: Tri State Distribution, Inc., Sparta, TN (US)

( * ) Notice: Subject to any disclaimer, the term of this patent is extended or adjusted under 35 U.S.C. 154(b) by 268 days.

(21) Appl. No.: 13/439,023

(22) Filed: Apr. 4, 2012

Related U.S. Application Data (60) Division of application No. 12/756,450, filed on Apr. 8, 2010, now Pat. No. 8,210,351, which is a continuation-in-part of application No. 12/209,197, filed on Sep. 11, 2008, now Pat. No. 7,823,726, application No. 12/756,450, which is a continuation-in-part of application No. 12/106,431, filed on Apr. 21, 2008.

(60) Provisional application No. 60/971,432, filed on Sep. 11, 2007, provisional application No. 60/971,575, filed on Sep. 12, 2007, provisional application No. 60/912,721, filed on Apr. 19, 2007, provisional application No. 60/943,600, filed on Jun. 13, 2007, provisional application No. 61/267,813, filed on Dec. 9, 2009.

(51) Int. Cl.
| | |
|---|---|
| *B65C 3/08* | (2006.01) |
| *B65C 3/06* | (2006.01) |
| *G09F 3/02* | (2006.01) |
| *B65C 9/26* | (2006.01) |

(52) U.S. Cl.
CPC ... *B65C 3/08* (2013.01); *B65C 3/06* (2013.01); *G09F 2003/0216* (2013.01); *G09F 2003/0226* (2013.01)

(58) Field of Classification Search
CPC ...... B65C 11/02; B65C 11/0205; B65C 3/06; B65C 3/08; B65C 9/0006; B65C 9/26; G09F 2003/0202; G09F 2003/0226; G09F 2003/0216
USPC .......... 156/277, 384, DIG. 5, DIG. 8, DIG. 9, 156/DIG. 49
See application file for complete search history.

(56) References Cited

U.S. PATENT DOCUMENTS

| | | | |
|---|---|---|---|
| 1,273,105 | A | 7/1918 | Dyke et al. |
| 2,091,346 | A | 8/1937 | Wright |

(Continued)

FOREIGN PATENT DOCUMENTS

| | | | |
|---|---|---|---|
| CA | 1304937 | | 7/1992 |
| CA | 2229971 | A * | 11/1998 |

(Continued)

OTHER PUBLICATIONS

Canadian Examination Report; Jun. 3, 2011.

(Continued)

*Primary Examiner* — Sonya Mazumdar
(74) *Attorney, Agent, or Firm* — Luedeka Neely Group, P.C.

(57) ABSTRACT

A system for labels that are positioned on a pharmaceutical container. The system can vary the choices for design and size of the labeling with respect to several types of container in which pharmaceuticals are positioned. The system increases the readability of information positioned on the pharmaceutical container by coordinating a label to the type and size of the container.

8 Claims, 12 Drawing Sheets

(56) References Cited

U.S. PATENT DOCUMENTS

| | | | |
|---|---|---|---|
| 3,942,710 A | 3/1976 | Collie | |
| 4,277,089 A * | 7/1981 | Lockhart | 462/67 |
| 4,341,155 A * | 7/1982 | Relyea et al. | 101/125 |
| 4,345,393 A | 8/1982 | Price et al. | |
| 4,666,185 A | 5/1987 | Pilborough | |
| 4,921,277 A | 5/1990 | McDonough | |
| 4,976,351 A * | 12/1990 | Mangini et al. | 206/232 |
| 5,046,609 A | 9/1991 | Mangini et al. | |
| 5,048,870 A | 9/1991 | Mangini et al. | |
| 5,324,559 A | 6/1994 | Brombacher | |
| 5,328,208 A * | 7/1994 | Garrison | 283/105 |
| 5,329,713 A | 7/1994 | Lundell | |
| 5,342,093 A | 8/1994 | Weemink | |
| 5,380,045 A | 1/1995 | Comann | |
| 5,571,358 A * | 11/1996 | Napier et al. | 156/227 |
| 5,603,409 A | 2/1997 | Braverman | |
| 5,642,906 A | 7/1997 | Foote et al. | |
| 5,727,819 A | 3/1998 | Grosskopf et al. | |
| 5,822,735 A | 10/1998 | De Lapa et al. | |
| 5,958,536 A | 9/1999 | Gelsinger et al. | |
| 5,976,014 A | 11/1999 | Petrick et al. | |
| 6,036,231 A | 3/2000 | Foote et al. | |
| 6,036,812 A * | 3/2000 | Williams et al. | 156/277 |
| 6,092,945 A * | 7/2000 | Takami et al. | 400/613 |
| 6,167,679 B1 * | 1/2001 | Horton-Steidle et al. | 53/411 |
| 6,217,078 B1 | 4/2001 | Roth et al. | |
| 6,240,394 B1 * | 5/2001 | Uecker et al. | 705/3 |
| 6,254,952 B1 | 7/2001 | Fox et al. | |
| 6,304,849 B1 | 10/2001 | Uecker et al. | |
| 6,343,695 B1 | 2/2002 | Petrick et al. | |
| 6,368,688 B1 | 4/2002 | Crum et al. | |
| 6,621,629 B2 | 9/2003 | Blumenthal | |
| 6,685,227 B2 * | 2/2004 | Merry et al. | 283/101 |
| 6,715,796 B2 | 4/2004 | Foote et al. | |
| 6,860,513 B2 * | 3/2005 | Kaufman | 283/81 |
| 7,185,453 B2 | 3/2007 | Spear et al. | |
| 7,438,322 B2 | 10/2008 | Miller | |
| 7,488,003 B2 * | 2/2009 | Weisz et al. | 283/105 |
| 7,827,058 B2 * | 11/2010 | Mortimer | 705/14.34 |
| 7,941,949 B2 | 5/2011 | Cloninger | |
| 2002/0093427 A1 | 7/2002 | Roth et al. | |
| 2002/0134498 A1 * | 9/2002 | Pennino et al. | 156/277 |
| 2003/0061750 A1 | 4/2003 | Bernier et al. | |
| 2003/0112466 A1 * | 6/2003 | Leonardi | 358/1.18 |
| 2004/0111934 A1 | 6/2004 | O'Connell | |
| 2004/0111941 A1 * | 6/2004 | Spear et al. | 40/638 |
| 2005/0102179 A1 | 5/2005 | Caplinger et al. | |
| 2005/0154641 A1 * | 7/2005 | Mortimer | 705/14 |
| 2005/0209915 A1 * | 9/2005 | Saluccio | 705/14 |
| 2006/0028014 A1 | 2/2006 | McQueeny et al. | |
| 2006/0163869 A1 | 7/2006 | Alder et al. | |
| 2007/0034103 A1 * | 2/2007 | Kaufman | 101/483 |
| 2007/0102109 A1 * | 5/2007 | Katritzky et al. | 156/277 |
| 2008/0100054 A1 | 5/2008 | Richards | |
| 2008/0284156 A1 | 11/2008 | Ugolick et al. | |
| 2009/0039640 A1 | 2/2009 | Nijjer et al. | |
| 2015/0083630 A1 * | 3/2015 | Miya et al. | 206/459.5 |

FOREIGN PATENT DOCUMENTS

| | | | |
|---|---|---|---|
| CA | 2302590 A1 * | 3/1999 | |
| EP | 924676 A2 * | 6/1999 | |
| GB | 2364989 A * | 2/2002 | |
| JP | 2003034335 | 2/2003 | |
| JP | 2006276646 A * | 10/2006 | |
| JP | 3151043 | 6/2009 | |
| JP | 3151043 U * | 6/2009 | |
| WO | 2006080945 A1 | 8/2006 | |
| ZA | 200002208 A * | 1/2001 | |

OTHER PUBLICATIONS

Canadian Examination Report; Mar. 30, 2012.
Label Land: multi-panel labels open up new market opportunities for Ontario label-maker, MacDonald, Jason, Canadian Packaging. toronto: Dec. 1999 vol. 52, Iss. 12; p. 12.
Target Label Sample—Applicants admit this is prior art.
Advertising on Labels of Medicine Containers, Examiners Report in Canadian Application 2629539, dated Jul. 23, 2013 (2 pages).

\* cited by examiner

METHOD FOR PRODUCING LABELS WITH MULTIPLE DESIGNS FOR PRESCRIPTION CONTAINERS

CROSS-REFERENCE TO RELATED APPLICATION

This application is a divisional of application Ser. No. 12/756,450, filed Apr. 21, 2010, and entitled Labels With Multiple Designs For Prescription Containers, which claims priority to:

U.S. Provisional Patent Application No. 61/267,813, filed Dec. 9, 2008, entitled "Method of Advertising on Pharmaceutical Containers With Codes Linked To Remote Coupons;

U.S. patent application Ser. No. 12/209,197, filed Sep. 11, 2008, entitled "Nestled Labels for Medicine Containers" (U.S. Pat. No. 7,823,726);

U.S. Provisional Patent Application Ser. No. 60/971,432, filed Sep. 11, 2007, entitled "Nestled Labels for Medicine Containers";

U.S. Provisional Patent Application Ser. No. 60/971,431, filed Sep. 11, 2007, entitled "Multiple Label Size Options for Medicine Containers";

U.S. Provisional Patent Application Ser. No. 60/971,575, filed Sep. 12, 2007, entitled "Distinct Label Panels With Revised Indicia On Prescription Medicine Containers";

U.S. patent application Ser. No. 12/106,431 filed Apr. 21, 2008, entitled "Advertising on Labels of Medicine Containers";

U.S. Provisional Patent Application Ser. No. 60/912,721 filed Apr. 19, 2007, entitled "Advertising on Labels of Medicine Containers"; and U.S. Provisional Patent Application Ser. No. 60/943,600 filed Jun. 13, 2007, entitled "Advertising on Labels of Medicine Containers".

CROSS-REFERENCES TO RELATED APPLICATIONS

This application is a continuation-in-part claiming priority to U.S. patent application Ser. No. 12/209,197 filed Sep. 11, 2008 entitled "Nestled Labels for Medicine Containers", which claims priority to U.S. Patent Application Ser. No. 60/971,432, filed Sep. 11, 2007, entitled "Nestled Labels for Medicine Containers"; U.S. Patent Application Ser. No. 60/971,431 filed Sep. 11, 2007, entitled "Multiple Label Size Options for Medicine Containers"; and U.S. Patent Application Ser. No. 60/971,575 filed Sep. 12, 2007, entitled "Distinct Label Panels with Revised Indicia on Prescription Medicine Containers".

This application is a continuation-in-part claiming priority to U.S. patent application Ser. No. 12/106,431 filed Apr. 21, 2008, entitled "Advertising on Labels of Medicine Containers", which claims benefit of U.S. Patent Application Ser. No. 60/912,721 filed Apr. 19, 2007, entitled "Advertising on Labels of Medicine Containers" and U.S. Patent Application Ser. No. 60/943,600 filed Jun. 13, 2007, entitled "Advertising on Labels of Medicine Containers".

This application is a non-provisional of, and claims priority to, U.S. Patent Application Ser. No. 61/267,813 filed Dec. 9, 2009 entitled "Method of Advertising on Pharmaceutical Containers with Codes Linked to Remote Coupons".

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present disclosure relates generally to a label that may be applied to a vial, bottle, or other container having a closure, which may be described as a cap or a top. The combination of the container and closure can be described as a closure container assembly or system and the closure and container assembly are designed to store and dispense materials, particularly pharmaceuticals. The label is specifically design to allow a user to have options as to the design of the label positioned on the container in such a manner as to relay information, such as information concerning the medicine or advertising, to a person that subsequently uses the container enclosure system. The label is also specifically design to facilitate minimization of the label and its substrate as the label and its substrate are produced while providing the label in a user friendly and at least partially automated format.

There are many types of closure systems described in the art. For example there are closures that are child resistant, closures that are non child resistant, and closures that are convertible from child resistant to non child resistant, from non child resistant to child resistant, or convertible between the two modes multiple times. Most of the technology in this field has been directed at improving the container and/or closure, or the interface between the container and closure.

Very little advancement has been directed towards the labeling or information provided with the pharmaceuticals or the labeling attached to the container. Typically the containers are cylindrical in nature and the labeling for those cylindrical containers is oriented such that the lines of alphanumeric characters are substantially perpendicular to the axis of the container. This can pose a problem for a user of the container in the reading of the information contained on the label.

Figure 1A:
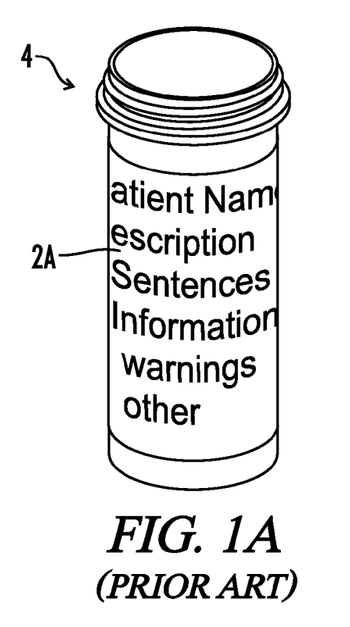
FIG. 1A shows an example of a conventional label placed on a smaller sized cylindrical pharmaceutical container in a pharmaceutical storage system.
Figure 1B:
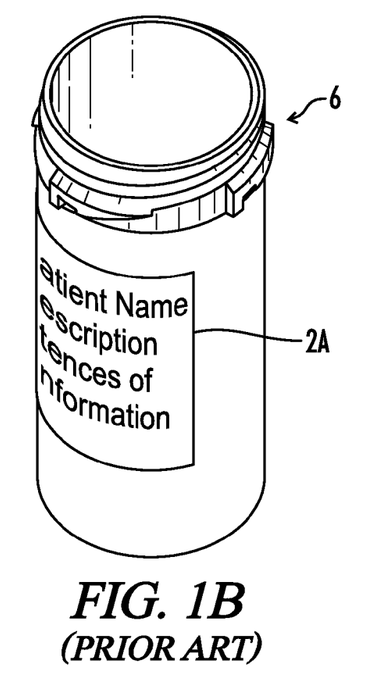
FIG. 1B shows the same conventional label placed on a larger sized cylindrical pharmaceutical container in a pharmaceutical storage system.
Figure 1C:
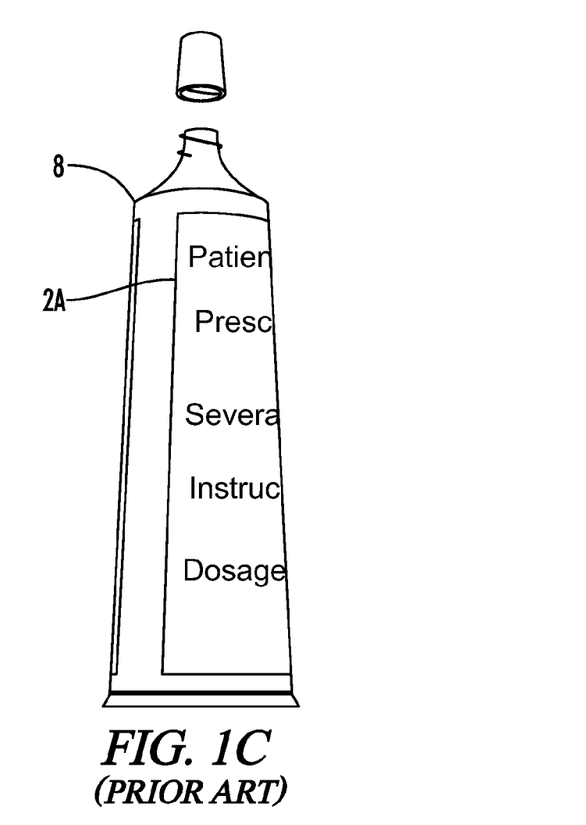
FIG. 1C shows the same conventional label placed on an alternate pharmaceutical container in a pharmaceutical storage system.

Additionally, when a non-cylindrical container, for example a dropper bottles, tubes, ointment containers, pump bottles and others, is used to house the pharmaceutical, the traditional labeling typically fails to match those alternate shapes and results in an inefficient information transfer to the end user or patient. This is illustrated in FIGS. 1A-1C with label 2A.

Additionally, prior art labels are usually printed in a single size and single geometric design in order to simplify inventory and procedures at the pharmacies. As a result, the label sizes are designed for the typically cylindrically shaped containers and usually the smallest sized of those containers. This leaves a majority of the circumferential space unused on larger cylindrically containers to which the standard small labels are affixed. This can unnecessarily result in the use of a smaller sized font, which can result in an ineffective message to the patient through by decreasing the readability of the font. This is illustrated in FIGS. 1A-1B with label 2A.

For example, typically the smaller containers have small diameters such that words having anything but more than a few letters require the holder of the container to rotate the container about its axis in order to be able to read the information contained thereon. This is especially cumbersome given the multiple characters and/or letters that comprise most medicines, which can be upwards of 15-20 letters long. Additionally, since these smaller sized labels and fonts are generally used on the larger containers, the information contained thereon is still hard to read even given the larger diameters of the larger containers. Any warnings on the labels in the form of sentences or small paragraphs require multiple turns and/or rotations of the container in order for a user to be able to read that information or are in a smaller font than necessary. This can be annoying and troublesome to the user and does not facilitate an ease of information transfer from a label to the user of a container.

Figure 1D:
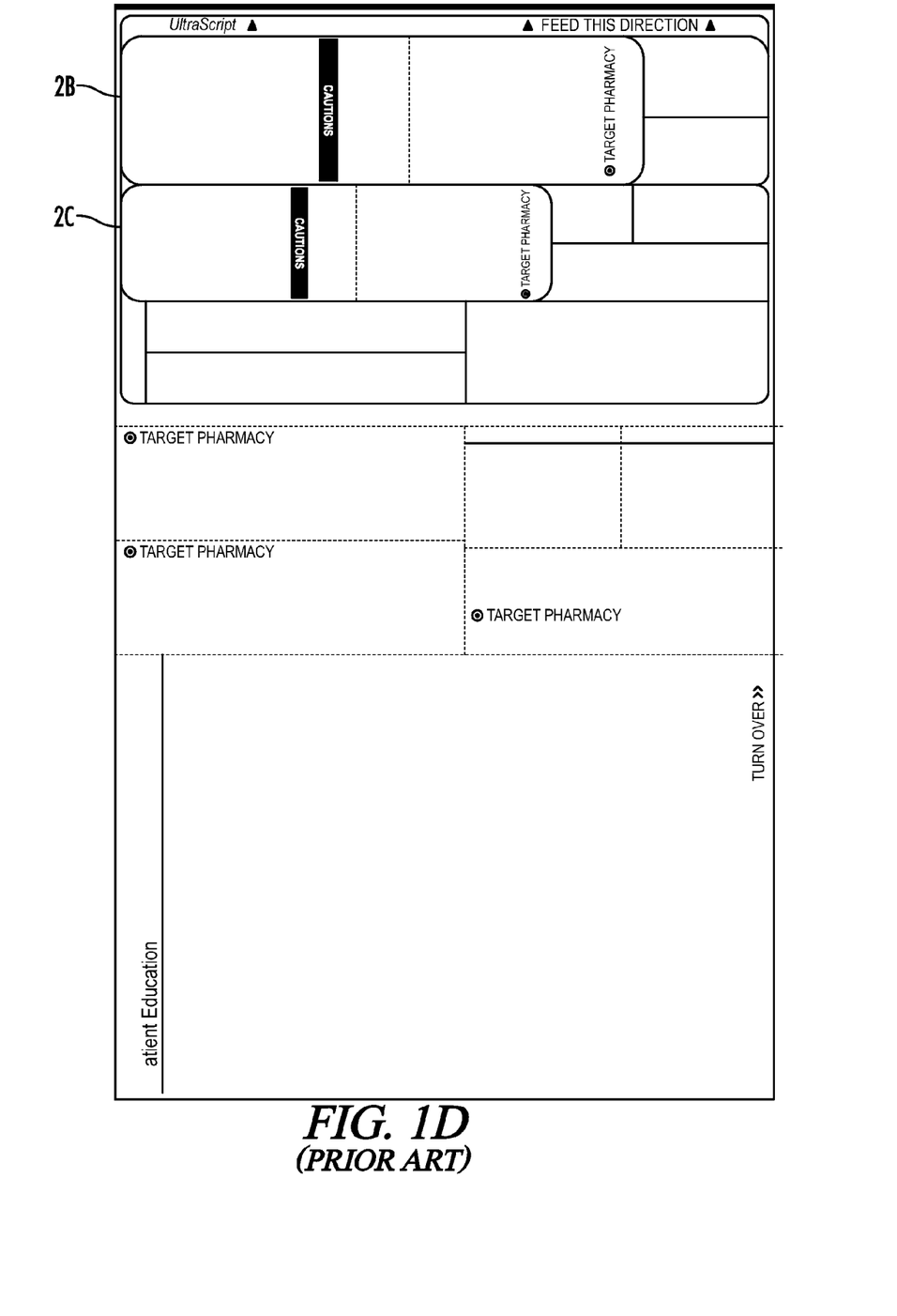
FIG. 1D shows a prior art label sheet having two labels having virtually identical designs and simply varying in size.
Figure 1E:
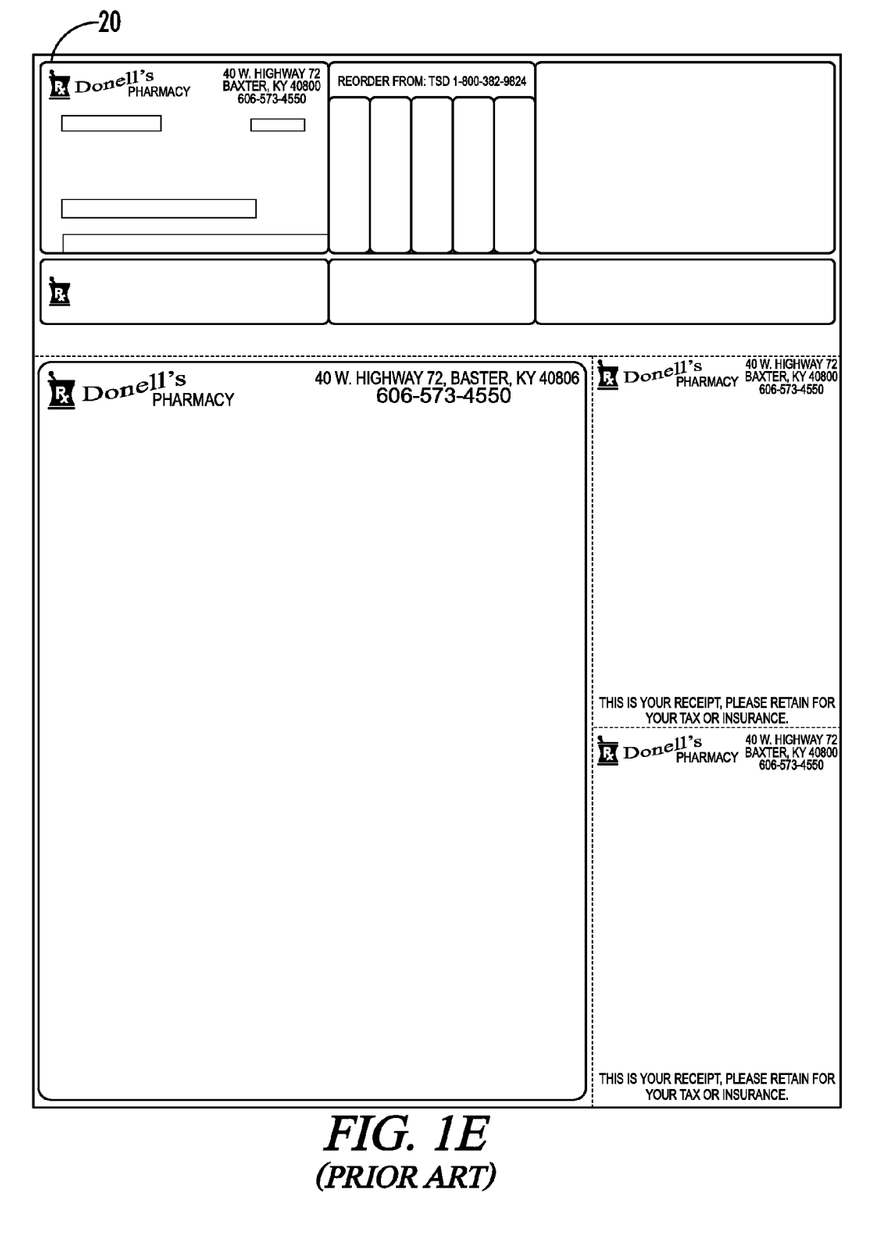
FIG. 1E shows a typical prior art label sheet having only one distinct primary prescription label 2D.
Figure 2A:
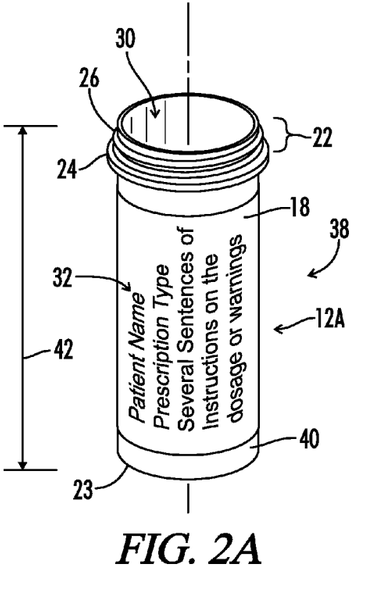
FIG. 2A shows an example of a label made and selected in accordance with the current disclosure selected and positioned on a smaller cylindrical pharmaceutical container in a pharmaceutical storage system.
Figure 2B:
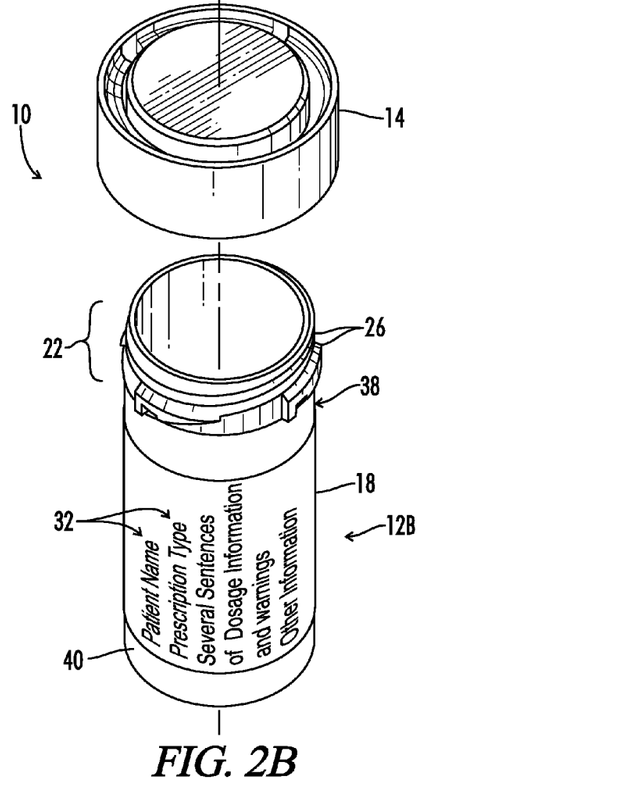
FIG. 2B shows a label made and selected in accordance with the current disclosure selected and positioned on a larger cylindrical pharmaceutical container in a pharmaceutical storage system.
Figure 2C:
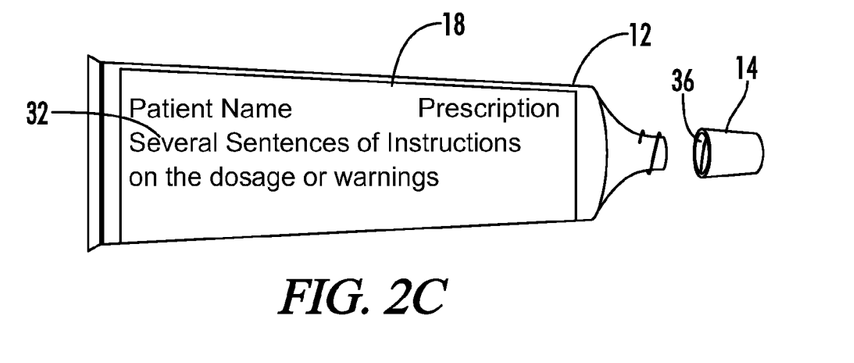
FIG. 2C shows a label made and selected in accordance with the current disclosure selected and positioned on an alternate pharmaceutical container in a pharmaceutical storage system.
Figure 3:
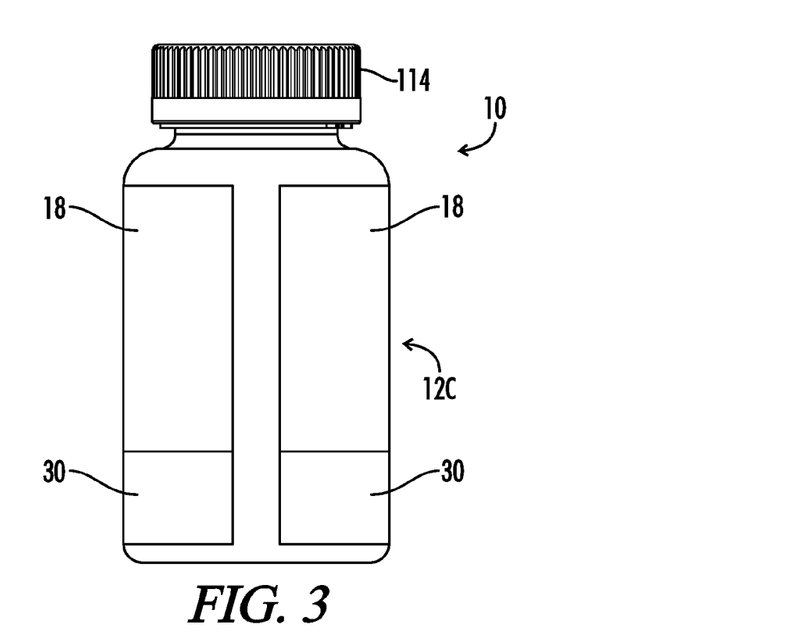
FIG. 3 shows a label made and selected in accordance with the current disclosure selected and positioned on a pharmaceutical container in a pharmaceutical storage system.
Figure 4:
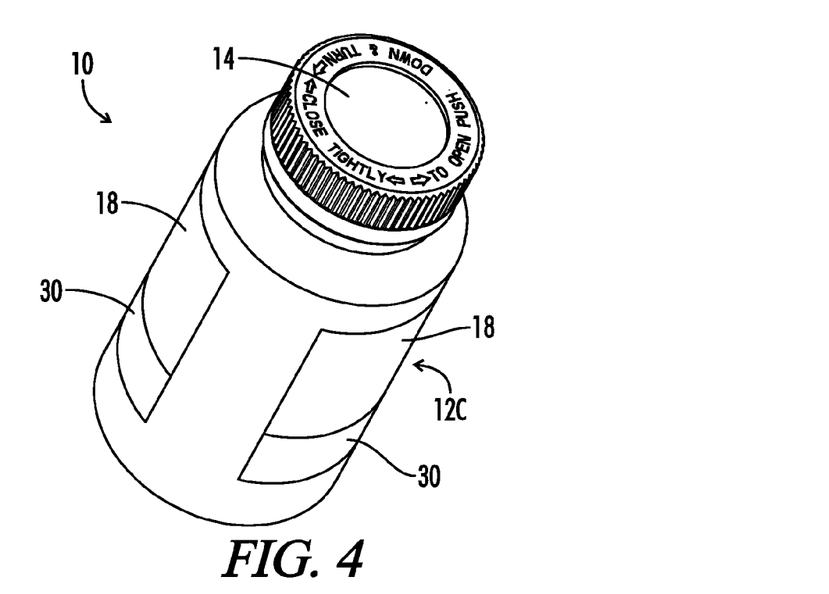
FIG. 4 is a perspective view of FIG. 3.
Figure 5:
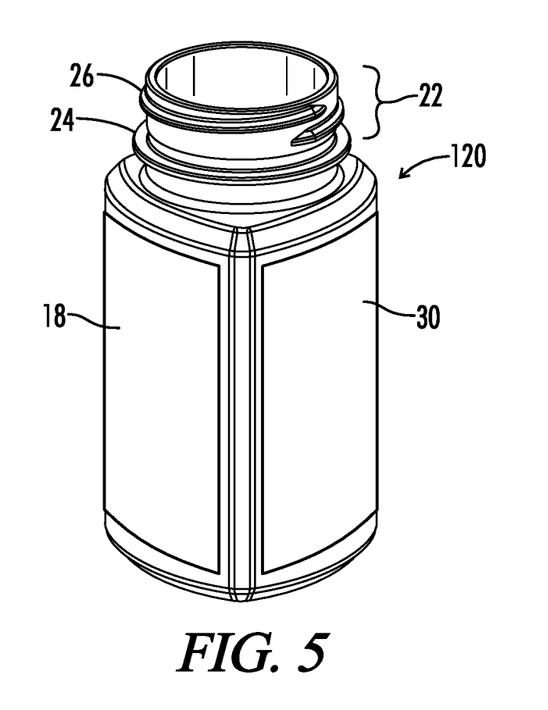
FIG. 5 shows a label made and selected in accordance with the current disclosure selected and positioned on an alternate pharmaceutical container in a pharmaceutical storage system.
Figure 6:
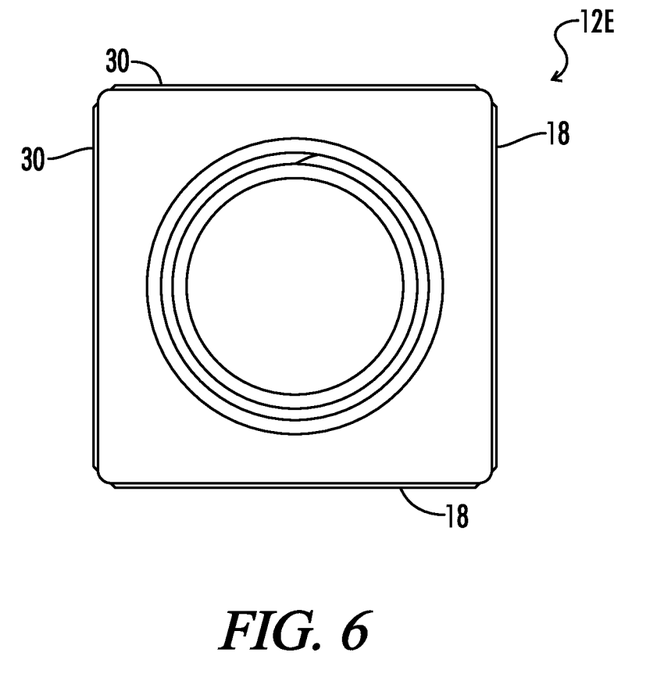
FIG. 6 shows a label made and selected in accordance with the current disclosure selected and positioned on an alternate pharmaceutical container in a pharmaceutical storage system.
Figure 7:
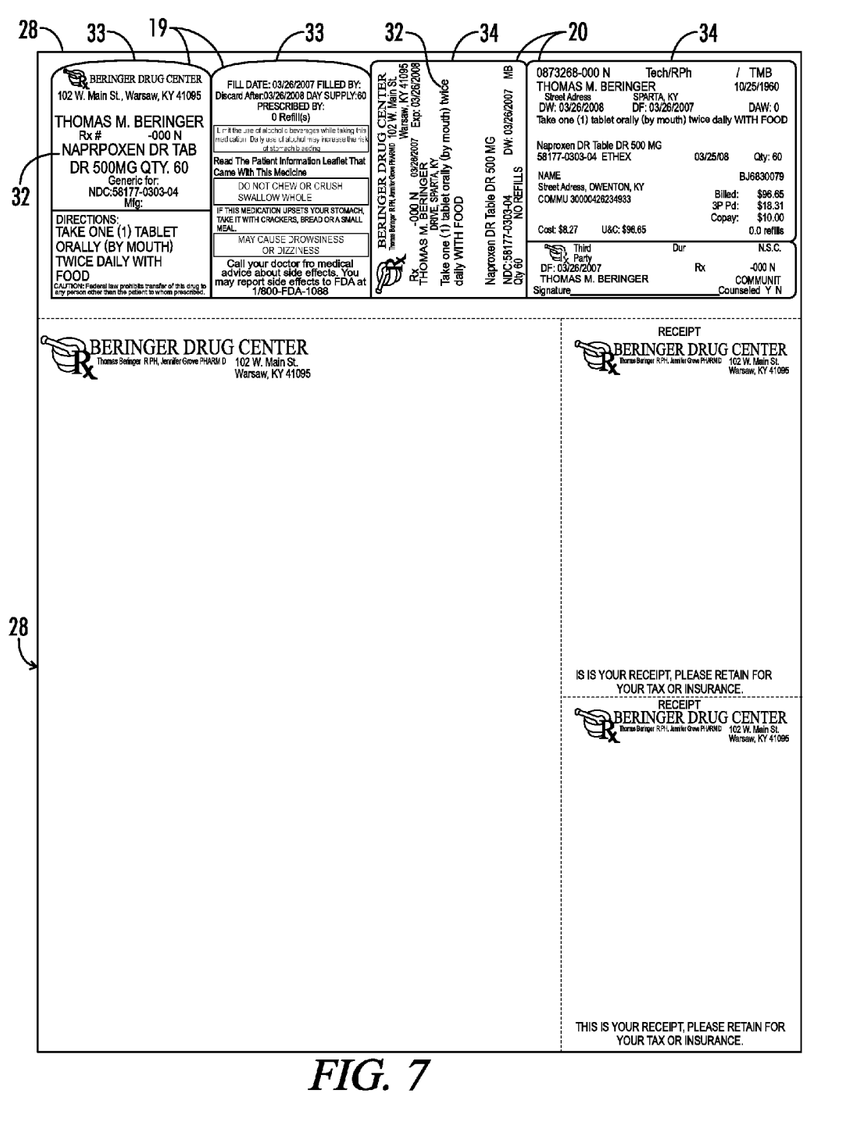
FIG. 7 is an example of a labeling system produced in accordance with the current disclosure.

Some prior art attempts have tried to vary only the size of labels on a single sheet. For example, FIG. 1D shows a label sheet having two labels with the only difference being that label 2C is smaller the label 2B. These labels have the same basic information layout. This type of label configuration does not address a situation when containers with alternate shapes, such as non-cylindrical containers, are used to house the pharmaceuticals. These containers with alternate shapes include ointment jars, ointment tubes and boxes, opthalmic boxes, and small unit of use bottles.

When non-cylindrical containers are used with the single size and single geometric design prior art label, this issue is exacerbated. The non-cylindrical containers typically force a pharmacist to either 1) have multiple label stocks and potentially multiple label printers to produce the multiple label designs and sizes needed or 2) use the label (typically the smallest label) that operates with all of the container shapes and sizes. Both options increase costs, operation time, and difficulty in the prescription filling process.

Another factor in the application of the labeling to the containers is the need for an ergonomic label design with respect to the containers and an ergonomic process for the actual selection of the labels by the user, such as a pharmacist, and placement of those label by the same on the containers.

Up until this point the space on a pharmaceutical container, namely the label or labels positioned thereon, have been used to provide information concerning the pharmaceuticals contained therein including the dosage warnings and other pertinent information. Portions of this space have been unused or at least under utilized.

In light of the foregoing there is a need for revised labeling system used with a pharmaceutical container. The revised labeling system preferably maximizes the readability of the information, medical or otherwise, positioned on the pharmaceutical container such that a reader of that information can readily read, ascertain and comprehend the information. The revised labeling system is preferably a single printing operation and provides a pharmacist label options that vary in configuration and size so that the pharmacist can select labeling that corresponds to numerous containers. The revised labeling preferably system minimizes any procedures for the placement of that labeling on the containers. This needed labeling is lacking in the art.

BRIEF SUMMARY OF THE INVENTION

The present disclosure is directed to a label system and labeling adapted for use in a closure and container system that can substantially obviate one or more of the problems due to limitation and disadvantage of the related art. Additional features and advantages of the disclosure will be set forth in the description which follows, and in part will be apparent from the description, or may be learned by practice of the disclosure. The objects and other advantages of the disclosure will be further realized and attained by those features of the disclosure particularly pointed out in the description and claims hereof as well as the appended drawings.

The present disclosure is directed to a system for labels that are positioned on a pharmaceutical container. The system can vary the choices for design and size of the labeling with respect to several types of container in which pharmaceuticals are positioned. The system increases the readability of information positioned on the pharmaceutical container by coordinating a label to the type and even size of the container.

The system is used in connection with a pharmaceutical storing and dispensing device having a closure and container. The pharmaceutical storing and dispensing device includes a label having alphanumeric indicia containing information, such as medical information, advertising, and the like.

These alphanumeric indicia can be orientated on the individual distinct primary prescription labels in multiple manners, such as substantially parallel or perpendicular with the axis of the container. Medical information can include the patient's name, name of the medicine, and optionally other medical information positioned on the container. The advertisement can be any advertisement, but preferably is directed at medical goods or services or goods or services that are geographically specific to the user and/or patient of the pharmaceutical container.

The container can include a bottom and a neck having an opening and one or more engaging devices positioned and shaped to interact with corresponding engaging devices on the closure. The axis of the container runs through the opening and bottom of the container. The preferred label system includes various distinct primary prescription label designs, one of which substantially corresponds with the perimeter and shape of the container and includes indicia oriented to increase readability of the same on the container.

A single substrate has several labeling options and is designed with multiple main die cut portions separating various sections of the labels on the substrate. For example, in a traditional peel and stick label configuration the various sections of the labels could be separated by perforations. The perforation could allow each distinct primary prescription label to be pulled apart from other sections, such as other peel and stick sections, or torn away as both a peel and stick section and the bonded section that is glued to the peel and stick portion.

Additionally, the current disclosure includes positioning multiple distinct primary prescription labels on a single substrate such that various distinct primary prescription label designs can be produced from the single substrate. For example, the multiple distinct primary prescription labels that are precut, or perforated, can be positioned on a single substrate. Each of the distinct primary prescription labels would include a different configuration, which can include perimeter shape, size and information location, within each distinct primary prescription label. Each distinct primary prescription label is design for placement on various shaped containers with each distinct primary prescription label designed for placement on at least one uniquely shaped container. For example, a first distinct primary prescription label can be shaped for placement on a cylindrical container, while a second distinct primary prescription label can be shaped for placement on a dose dispensing collapsible tube type container. Each distinct primary prescription label in the label system can have a design that accommodates various sized containers as well.

In a first method, a label page, which can be in sheet or roll form, is preferably printed for a prescription. A person, such as a pharmacist, can then selected the printed distinct primary prescription label on the label page that conforms to the container needed for that particular pharmaceutical prescription. Typically in this arrangement the container would already house the pharmaceutical for the patient and the pharmacist would select and apply the appropriate distinct primary prescription label to correspond to that container.

Alternately, the distinct primary prescription label for a particular pharmaceutical prescription can be selected before any indicia, or print, is positioned on any portion of the label page in the label system. As such, the selected distinct primary prescription label maximizes the amount of label space and/or readability of the indicia on that selected label for a given container. This helps to alleviate potential confusion by the pharmacist and saves ink during the printing process.

The distinct primary prescription label that would be selected is ultimately determined by the container that is preselected depending based on the pharmaceutical prescription. For example, if the pharmaceutical prescription is dosed in pill form, a traditional cylindrical container could be preselected and the distinct primary prescription label on the label system corresponding to that cylindrical container could be printed. The additional labels on the substrate of the label system could then be left blank. The pharmacist could then simply selected and apply the printed label. Alternately, if the if the pharmaceutical prescription is dosed in ointment form, a traditional collapsible tubular container could be preselected and the label on the label system corresponding to that container could be printed.

This allows the use of one printed document or one general label with sub-labels, alternate distinct primary prescription label, or subsections for multiple container configurations and sizes. The substrate supporting the labels and comprising part of the label page can be various substrates known in the art such as sheet labels or roll labels.

Software can be designed in an operating system to correspond with the varying containers, normally dependent upon the type, size and amount of the pharmaceutical contained in the container, to produce a single label page. The single label page has at least two primary distinct prescription labels. One of the distinct primary prescription labels can be selected by design and size from several options based upon the container to which the distinct primary prescription label shall be attached. The indicia printed on the distinct primary prescription label are selected based on the container and the preset label options.

Also taught by the current disclosure is a pharmaceutical storage system for a pharmaceutical prescription. The prescription is for a patient and typically dispensed at a pharmaceutical facility by a pharmacist.

The system comprises a first container having a first shape and a first container engagement device, and a second container having a second shape and a second container engagement device. The second shape differs from the first shape and the second container engagement device differs from the first container engagement device. Also included is a closure having a closure engagement device shaped to engage and removably attached to one of the container engagement devices.

Included is a label system having a substrate removably adhered to a first distinct primary prescription label having a first perimeter and a second distinct primary prescription label having a second perimeter. The first perimeter differs from a second perimeter and each distinct primary prescription label includes substantially similar information describing the pharmaceutical prescription and the patient. The substrate further includes a panel attached thereto where the panel includes information directed at the consummation of the pharmaceutical and information directed at the sale of the pharmaceutical that will be positioned in the container.

Also included is a method of producing a label for a pharmaceutical container that will contain a pharmaceutical prescription for a patient. The method comprises selecting a container having a container design and size based upon the pharmaceutical prescription. Next, indicia are printed on a label system having a plurality of distinct primary prescription label designs on a single label page. The indicia provide information on the prescription and the patient with each distinct primary prescription label design containing a majority of this information. Next, the method teaches selecting at least one of the distinct primary prescription label designs based upon the container design and size to which the distinct primary prescription label is to be affixed. Then the method teaches removing the distinct primary prescription label selected and positioning that distinct primary prescription label on the container selected.

Also taught is a method of producing a label for a pharmaceutical container that will contain a pharmaceutical prescription for a patient. The method comprises providing a label system having at least two distinct primary prescription label designs on a single label page wherein each distinct primary prescription label varies in perimeter geometry and size. The method also comprises printing similar information about the prescription and the patient on each distinct primary prescription label design. A container having a container design and size is selected based upon the pharmaceutical prescription. A label from the distinct primary prescription label designs is selected to correspond with the container design and size.

It is therefore a general object of the present disclosure to provide improved labeling for pharmaceutical containers.

Another object of the present disclosure is to provide multiple labeling options for a user of labeling of pharmaceutical containers.

Still another object of the present disclosure is to provide a system for selecting a labeling to maximize the readability and/or amount of information carried in a label of a pharmaceutical container.

Still another object of the present disclosure is to provide a labeling method and system in which multiple distinct primary prescription label designs are on a single substrate.

Yet still another object of the present disclosure is to provide a system for selecting a labeling to correspond with a particular container type.

Other and further objects, features and advantages of the present disclosure will be readily apparent to those skilled in the art upon reading of the following disclosure when taken in conjunction with the accompanying drawings.

DETAILED DESCRIPTION OF THE INVENTION

As seen in FIGS. 1A-1C, a conventional label 2A is typically selected to correspond to the size requirements of the smallest cylindrical container 4. This, while potentially beneficial for the smaller cylindrical container, leaves a large amount of unused space on the larger container 6 and can overwhelm non-cylindrical containers 8. As such the indicia, such as the font style, size and type can be limited based upon the size of the single label design. Various instructions and warnings typically are either 1) placed in an overlapping fashion, 2) use smaller type or less readable font than preferred, 3) are not typically maximized for information transfer to the end user of the pharmaceuticals, and/or 4) not attached to the container but rather placed on other loose sheets that typically do not stay with the container during the consumption of the full dosage of the prescription.

A pharmaceutical system is shown and generally designated by the numeral 10 and includes a container 12 and closure 14. The container 12 is used for storage and dispensing of pharmaceuticals from a pharmaceutical prescription. The prescription is generally for a patient advised to take that prescription. Various closures 14 can be used in conjunction with the containers 12.

As known in the art, the pharmaceuticals can take many forms including pill/tablet, liquid, lotion, and the like, which corresponds to the containers 4, 6, and 8 that varying in size and form in order to properly store and dispense these pharmaceuticals. For example, the container can be a small cylindrical container 12a, a larger cylindrical container 12b, a collapsible tube 12c, a triangular shaped container 12d, a quadrilateral shaped container 12e, or other shaped containers as known in the art including dropper bottles, ointment containers, pump bottles, and the like.

The containers can include a neck 22, with or without a rim 24, and an engaging device 26. The engaging device 26 contacts the closure 14 for the various containers to secure the closure 14 to the containers. Engaging device 26 is designed to interact with the closure 14 to secure the pharmaceuticals contained inside the containers. The label 18 can be selected such that a preferred amount of information concerning the patient, pharmaceutical, and other aspects associated with the container can be displayed.

The label 18 is selected from a labeling system 16 that includes multiple labels 18. For example, the label system 16 includes distinct primary prescription labels 19 and 20 positioned on a substrate 28, such as a sheet of material or a roll of material, used to removably store adhesively backed labels. The distinct primary prescription labels 19 and 20 are specifically designed to correspond to one of the containers, for example containers 12a-12e, and the like.

The labeling system 16, with distinct primary prescription labels 19 and 20, include information 32 directed at the pharmaceutical within the container 12, the patient for whom the pharmaceutical was prescribed, or other pertinent information concerning those items. This information 32 is printed on the distinct primary prescription labels 19 and 20 in various patterns and orientations designed to enhance the readability of that information once the distinct primary prescription label, 19 or 20, is positioned on a container 12. As such, the orientation of the information 32 can be specifically designed to vary from distinct primary prescription label 19 to distinct primary prescription label 20. For example, in distinct primary prescription label 19, the information is written parallel with the shortest axis of each panel of the distinct primary prescription label, while on distinct primary prescription label 20, the information 32 is printed parallel with the longest axis of each panel of the distinct primary prescription label 20. This can be described as positioning the information in first and second orientations.

This allows a person, such as a pharmacist, to select the label 19 or 20 that best provides for the readability of the information 32 once said label is positioned on a container 12. This facilitates the needed for medical information concerning the prescription within the container to stay with the container during the consumption and use of the pharmaceutical held within that container.

The substrate 28, or label page 28, can include other panels that contain information, such as on the sale of the pharmaceutical positioned in the container or information directed at the consummation of the pharmaceutical in the container. Additionally, l distinct primary prescription labels, 19 and 20, as well as the additional panels in the substrate 28, can include advertisements 30 as desired by the pharmacist or the manufacturer of the labeling system.

The labels 18, 19, and 20 can be the traditional peel on stick design such that the peel on stick paper portions are glued to a lower, bonded paper section, such as a substrate. These labels can have individual perforations and/or sections from which they are peeled from the substrate 28. This substrate 28 can be a sheet form or roll form. On the substrate 28, the distinct primary prescription labels 19 and 20 are preferably positioned adjacent to another. The substrate 28 usually passes through a printer in which the software prints the information on the labels as programmed. A printer, such as a laser printer, can print the information or indicia on the label page. Other printer types known in the art can be used, including direct thermal printers, indirect thermal printers, and the like. The process can be automated such that once a prescription is entered into a computer processing system, a container and its corresponding label that matches up to that container type and size is printed.

Generally the pharmaceutical storage system 10 comprises first and second containers having first and second shapes and first and second engagement devices. The second shape differs from the first shape while the second container engagement device typically differs from the first container engagement device. Examples of the engagement devices include lugs and threads, as pictured in the figures, but can also include beads and other engagement devices known in the art.

A closure is included that has a closure engagement device shaped to engage and removably attach to one of the container engagement devices. The closure engagement devices can be closure devices as depicted in the figures, including lugs and/or threads, or can include other engagement devices known in the arts.

The labeling system 16 includes a single substrate 28 removably adhered to first and second distinct primary prescription labels 19 and 20. The first and second distinct primary prescription labels have first and second perimeters that differ from each other and both labels include substantially similar information 32 describing the pharmaceutical prescription and the patient for which the pharmaceutical prescription is for. This information 32 is intentionally altered in its presentation on each distinct primary prescription labels 19 and 20. Each distinct primary prescription label 19 or 20 can include a plurality of panels 33 or 34 containing various portions of the information 32. These panels 33 or 34 can be separated from the distinct primary prescription labels 19 and 20 and applied to the container as desired.

The containers typically include a bottom 23, opposite the neck 22, which houses the container engagement device 36. The containers also include a body 38 having an external surface 40 with a length 42 measured from the neck 22 to the bottom 23. The distinct primary prescription label 19 or 20 is shaped to fit on the external surface of the container 12 between the neck and the bottom 23. Once selected, the distinct primary prescription label 19 or 20 becomes the label 18 for that container 12.

Also included is a method for producing a label 18, for a pharmaceutical container 12 that will contain a pharmaceutical prescription for a patient. The method can comprise selecting a container having a container design and size based upon the pharmaceutical prescription. Next, indicia are printed on a label system having plurality of distinct primary prescription label designs on a single label page. The indicia provide the information on the prescription and the patient with each distinct primary prescription label design containing the majority of the same information. Then at least one of the distinct primary prescription label designs is selected base upon the container design and size. Then that selected distinct primary prescription label is removed and positioned on the container.

Additionally, an alternate method is taught for producing a label for pharmaceutical container that will house a pharmaceutical prescription for a patient. That method can comprise providing a label system having a plurality of distinct primary prescription label designs on a single label page with each distinct primary prescription label varying in perimeter geometry and size. Substantially similar information can be printed on each label design with that information including details the prescription and the patient for which the prescription is written and filled.

A user and/or system can then determine a container having a container design and size based upon the pharmaceutical prescription. Once that container has been decided, a label can be selected from a plurality of distinct primary prescription label designs that correspond with the container design and size. This label can then be positioned on the container. The label is preferably selected to maximize the information on the label that is provided to a user of the pharmaceutical prescription.

Figure 8:
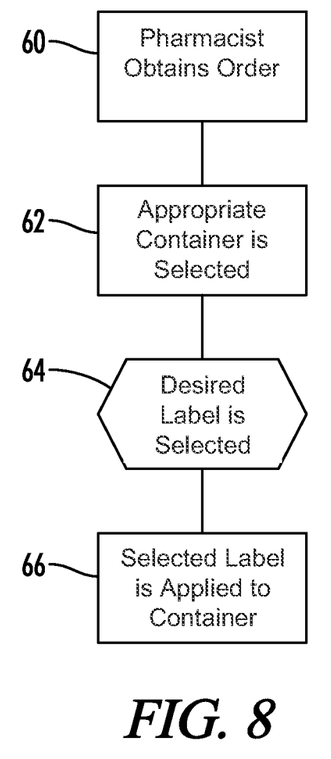
FIG. 8 is a schematic of a method of selecting a label for a preferred container in accordance with the current disclosure.
Figure 9:
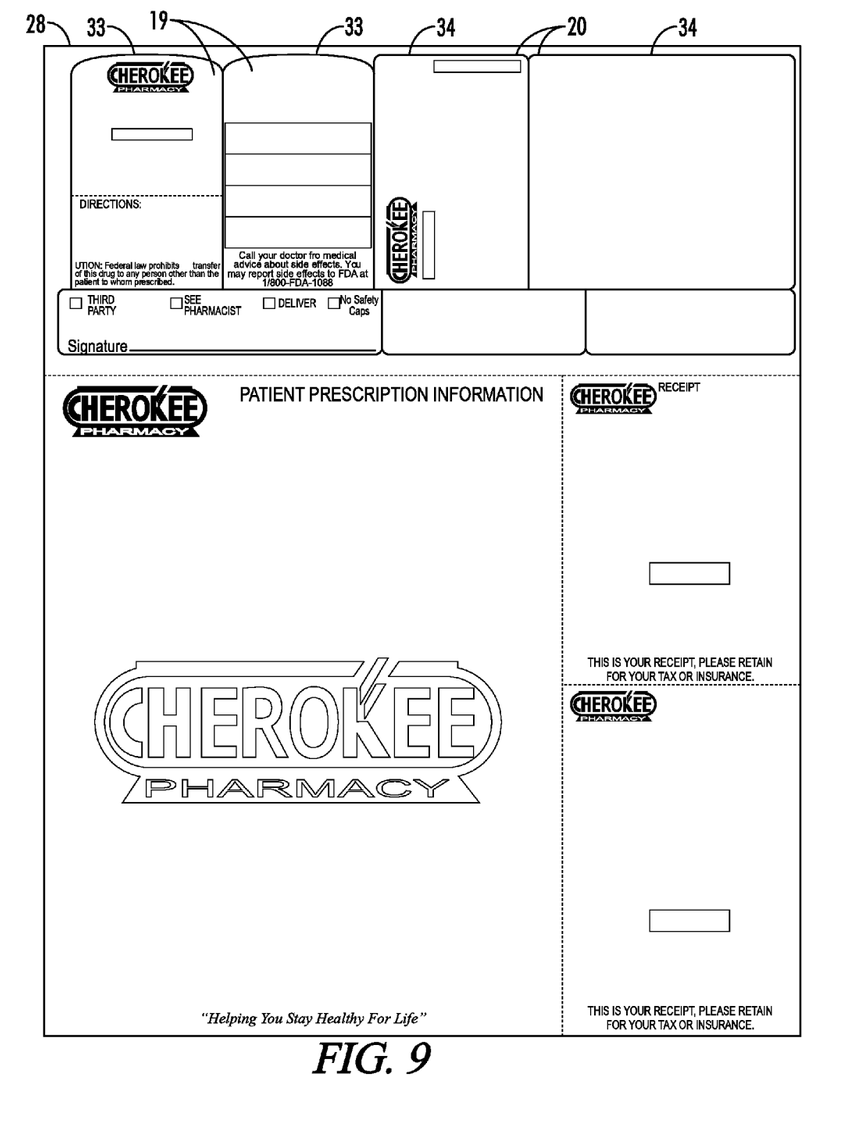
FIG. 9 is an example of a labeling system in sheet form produced in accordance with the current disclosure, the system shown without all of the added information.
Figure 10:
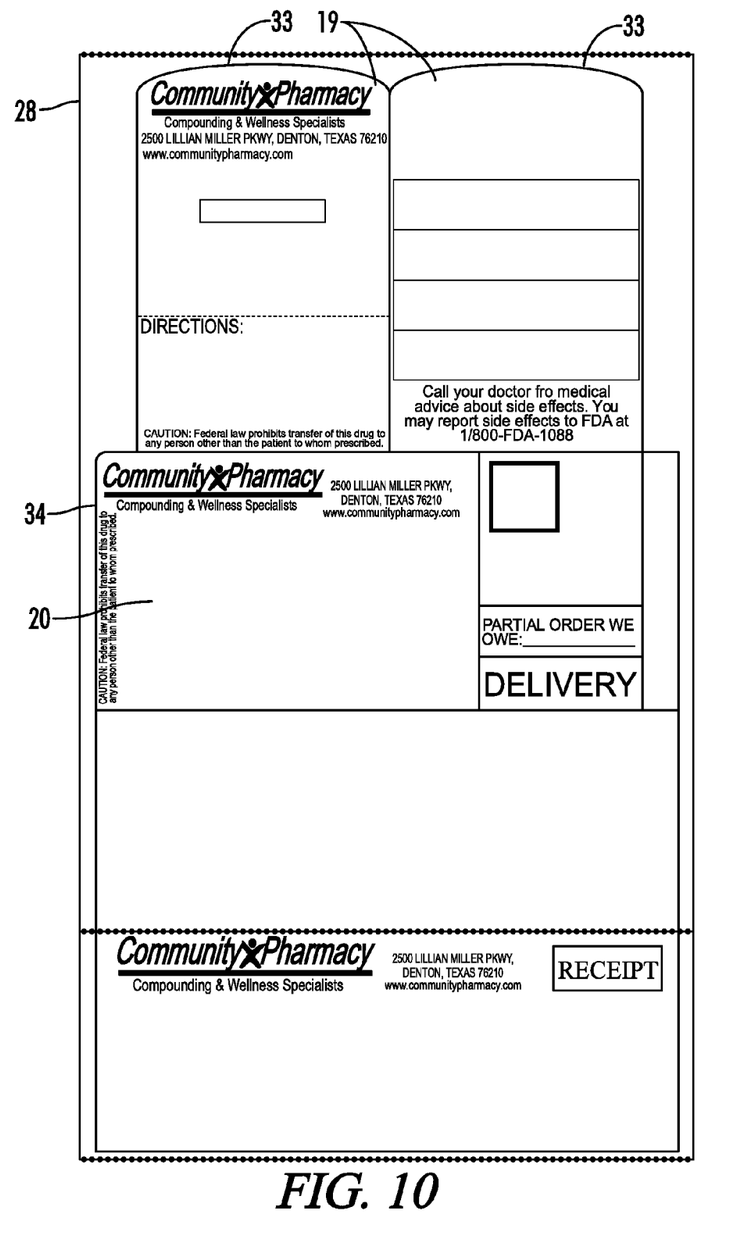
FIG. 10 is an example of a labeling system in roll form produced in accordance with the current disclosure, the system shown without all of the added information.

Now turning to FIG. 8, a method of selecting a desired label for a given container is schematically shown. This includes the step 60 of obtaining a pharmaceutical order which includes the type of pharmaceuticals including the size of individual pharmaceuticals as well as the dosage amounts. This information can be used to determine the volume of the pharmaceutical to be dispensed. Next a container is selected based upon proper federal guidelines based upon that pharmaceutical type, dosage, and size as schematically illustrated in 62. Next a desired label is selected in 64 for that container. This step can be performed by a user, such as a pharmacist where he or she picks a distinct primary prescription label from the programming, for example, 19 or 20. Alternately, this process can be handled by automated systems, such as a computer and printer, which know the type and size of the container to be used and can produce, such as by printing, the desired distinct primary prescription label based upon that container. Next, the selected distinct primary prescription label is placed on the container in operation 66 for a user, for example the individual for whom the pharmaceuticals are dispensed, to obtain information concerning the pharmaceuticals therein.

Thus, although there have been described particular embodiments of the present disclosure of a new and useful Labels with Multiple Design for Medicine Containers, it is not intended that such references be construed as limitations upon the scope of this disclosure except as set forth in the following claims.

What is claimed is:

1. A method of producing a label for a pharmaceutical container to contain a pharmaceutical prescription for a patient whereby a pharmacy may reduce a number of distinct labels required for labeling containers having different sizes for saving the pharmacy money, reducing their workflow requirements, reducing inventory, and enhancing productivity, the method comprising the steps of:
   a. providing a container supply at the pharmacy having at least a first container and a second container, the first and second containers differing in design and size;
   b. selecting one of the first container and second containers from the supply, the selected container having a container design and size based on the pharmaceutical prescription;
   c. providing a label system at the pharmacy having at least a first distinct prescription label and a second distinct prescription label, each label having a different design, and each label being positioned on a single label page and varying in perimeter geometry and size;
   d. printing indicia on the single label page, the indicia being printed on the first distinct prescription label in a first orientation based on the design and size of the first container and being printed on the second distinct prescription label in a second orientation based on the design and size of the second container, the indicia on each of the first distinct prescription label and the second distinct prescription label providing substantially the same information on the prescription and the patient, the information including an identification of a prescribed pharmaceutical and dosage information providing instructions to the patient regarding consummation of the prescribed pharmaceutical, the substantially the same information including the identification of the same prescribed pharmaceutical and the same dosage information;
   e. selecting at least one of the labels based on the container design and size; and f. removing the selected label from the label page and positioning the selected label on the selected container at the pharmacy.

2. The method of claim 1 wherein steps b., d., and e. are performed by an automated system.

3. A method of producing a label for a pharmaceutical container to contain a pharmaceutical prescription for a patient whereby a pharmacy may reduce a number of distinct labels required for labeling containers having different sizes for saving the pharmacy money, reducing their workflow requirements, reducing inventory, and enhancing productivity, the method comprising the steps of:
   a. providing a label system at the pharmacy having at least a first distinct prescription label and a second distinct prescription label on a single label page, each label having a different design and varying in perimeter geometry and size;
   b. printing substantially the same prescription information and patient information on each of the first distinct prescription label and the second distinct prescription label, the prescription information printed on each label including an identification of the same prescribed pharmaceutical and the same dosage information providing instructions to the patient regarding consummation of the prescribed pharmaceutical;
   c. determining a container having a container design and size based on the pharmaceutical prescription; and
   d. selecting one of the labels to correspond with the container design and size.

4. The method of claim 3 wherein in step d. the selected label is selected to maximize the information that is provided to a user of the pharmaceutical prescription.

5. The method of claim 3 wherein steps a., b., and c. are performed by an automated system.

6. The method of claim 3 wherein in step b. the information is printed on one of the labels in a first orientation and the information is printed on another of the labels in a second orientation.

7. The method of claim 6 wherein the first orientation is different than the second orientation.

8. The method of claim 1 wherein the first orientation is different than the second orientation.

\* \* \* \* \*